United States Patent

[11] 3,630,076

| [72] | Inventor | James E. Staudt<br>206 Audubon Street, Hartselle, Ala. 35640 |
|---|---|---|
| [21] | Appl. No. | 889,757 |
| [22] | Filed | Dec. 31, 1969 |
| [45] | Patented | Dec. 28, 1971 |

[54] ENGINE ANALYZER
7 Claims, 8 Drawing Figs.

[52] U.S. Cl........................................................... 73/117.3,
324/15, 324/19
[51] Int. Cl. ...................................................... G01m 15/00
[50] Field of Search......................................... 73/116,
117, 117.3

[56] References Cited
UNITED STATES PATENTS

| 3,439,534 | 4/1969 | Pilgrim........................ | 73/117 |
| 3,485,093 | 12/1969 | Muller et al. ................ | 73/116 |
| 3,400,579 | 9/1968 | Parmater et al. ............. | 73/117.3 |

*Primary Examiner*—Jerry W. Myracle

ABSTRACT: A computerized analyzer for rapid diagnosis of an apparatus, which, by way of example may be an automotive vehicle. In such an application, the analyzer will read and/or compare the vehicle specifications to the related actual vehicle condition. The analyzer will also record either of these readings.

James E. Staudt
INVENTOR

James E. Staudt,
INVENTOR

ENGINE ANALYZER

BACKGROUND OF THE INVENTION

Conventional diagnosis equipment is rapidly becoming obsolete. This is so for many reasons:

The operation of present equipment requires longer periods of time than good business practice can allow;

The lengthy procedures now required are extremely susceptible to human error;

The equipment cannot produce consistent results of required accuracy;

The equipment cannot produce a permanent record of either the required specifications or the vehicle's related actual adjustments and conditions;

Records which presently must be prepared by the equipment operator are usually untidy and difficult to read;

The equipment is often bulky and quite heavy.

These deficiencies may be more readily understood when related to a description of the procedure required to properly use conventional-type analysis equipment. Such a procedure would normally involve the following steps:

1. A search through hundreds of classified cards to find the applicable specifications;
2. Manual reproduction of the specifications from the card to a test sheet;
3. Make a plurality of connections required to attach the equipment to the vehicle;
4. Refer back and forth between the test sheet and the meters at least one time for each specification to be checked;
5. Manually record the visually observed meter readings which indicate the adjustments and condition of the vehicle;
6. Perform the necessary repairs and adjustments;
7. Repeat step (4); and
8. Repeat step (5).

It is clear that such a procedure devotes more time to manual reproduction of specifications and readings, and to comparison of specifications to actual conditions than would normally be devoted to the repairs and adjustments themselves.

SUMMARY OF THE INVENTION

My invention generally includes a system for automatic, semiautomatic and manual testing. It is particularly useful in the testing of automotive vehicles, however, the concept is applicable to many other uses. Typically, this system includes: a computer which receives and/or emits control and data signals from all other major components of the system; an information storage device which contains data relating to the equipment to be tested; an input/output group which receives and compares signals from the equipment being tested to signals which the computer has extracted from the information and storage device; a printing device which upon command produces printed copy of selected specification data taken from the memory, as well as data received from the equipment being tested; and a control panel which contains controls and indicators necessary for operation of the system.

Accordingly, it is an object of my invention to provide a system for the rapid, accurate and simplified analysis of a specimen which by way of example may be an automotive vehicle.

An additional object of my invention is to provide such a system for automotive vehicle analysis which would alleviate the difficulties encountered in the use of conventional systems as set forth above.

A further object of my invention is to provide such an automotive vehicle analysis system wherein retrieval of applicable specifications is accomplished without resort to extended searching.

Another object of my invention is to provide such a system wherein automotive specifications are automatically or semiautomatically retrieved and reproduced.

Yet another object of my invention is to provide such a system wherein specifications are reproduced in the form of a temporary visual indication as well as permanent printed copy.

Still another object of my invention is to provide such a system wherein specifications may be directly compared to actual vehicle conditions.

A still further object of my invention is to provide such a system which will produce a permanent printed copy of actual vehicle conditions before and after vehicle adjustments or repairs have been made.

DESCRIPTION OF THE PREFERRED EMBODIMENTS

While the systemic concept of my invention may be used in the analysis of any specimen capable of emitting a measurable signal, for purposes of illustration, the system described herein is designed to perform automatic and semiautomatic analysis of reciprocating internal combustion engines or any other vehicle component capable of emitting a measurable signal. The term reciprocating internal combustion engine, which will hereafter be abbreviated to engine, includes not only an engine proper but also the supporting equipment usually employed in conjunction with an engine. Generators, alternators, voltage regulators, fuel pumps, and batteries are representative of this supporting equipment. The system is intended to allow a trained operator to perform sophisticated tests upon an engine and as a result of these tests indicate what corrective action is required. If the corrective action so indicated falls into the class of repairs that can be accomplished "on the spot" then the system can and does indicate when it has been performed correctly. The system produces a printed record of both the required specifications and the condition of the engine either prior to or after repairs or adjustments are performed.

Figure 1:
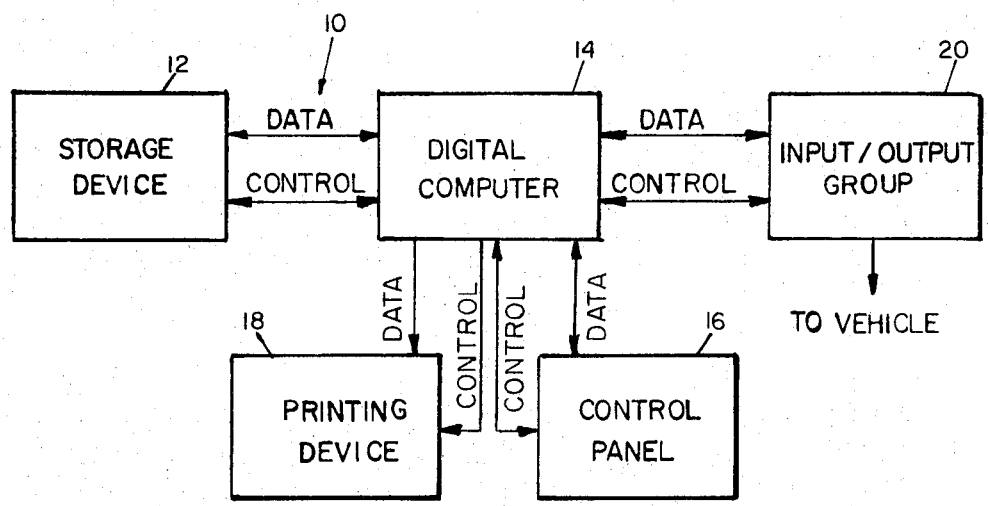
FIG. 1 is a block diagram of a preferred embodiment of the system in accordance with the principles of the invention.

As shown in FIG. 1, the analyzer system 10 includes a storage device 12 which retains a large mass of data consisting of specifications of any vehicle an operator is likely to encounter. This data is arranged and/or labeled in the storage medium in such a way that it is automatically or semiautomatically accessed by a digital computer 14 which performs the task of directing the rest of the system as well as the operator such that both perform in an orderly manner. The computer is intimately connected to a control panel 16 which provides the means by which information may flow between the operator and the computer. In addition to the control panel a printing device 18 produces permanent records of computer output and is also used to provide information to the operator. The printing device also transcribes readings taken directly from the vehicle under test. An input/output group 20 provides interfaces for the various signal-producing vehicle components, indicating equipment, and digital electronics employed by the system.

COMPUTER

Figure 2:
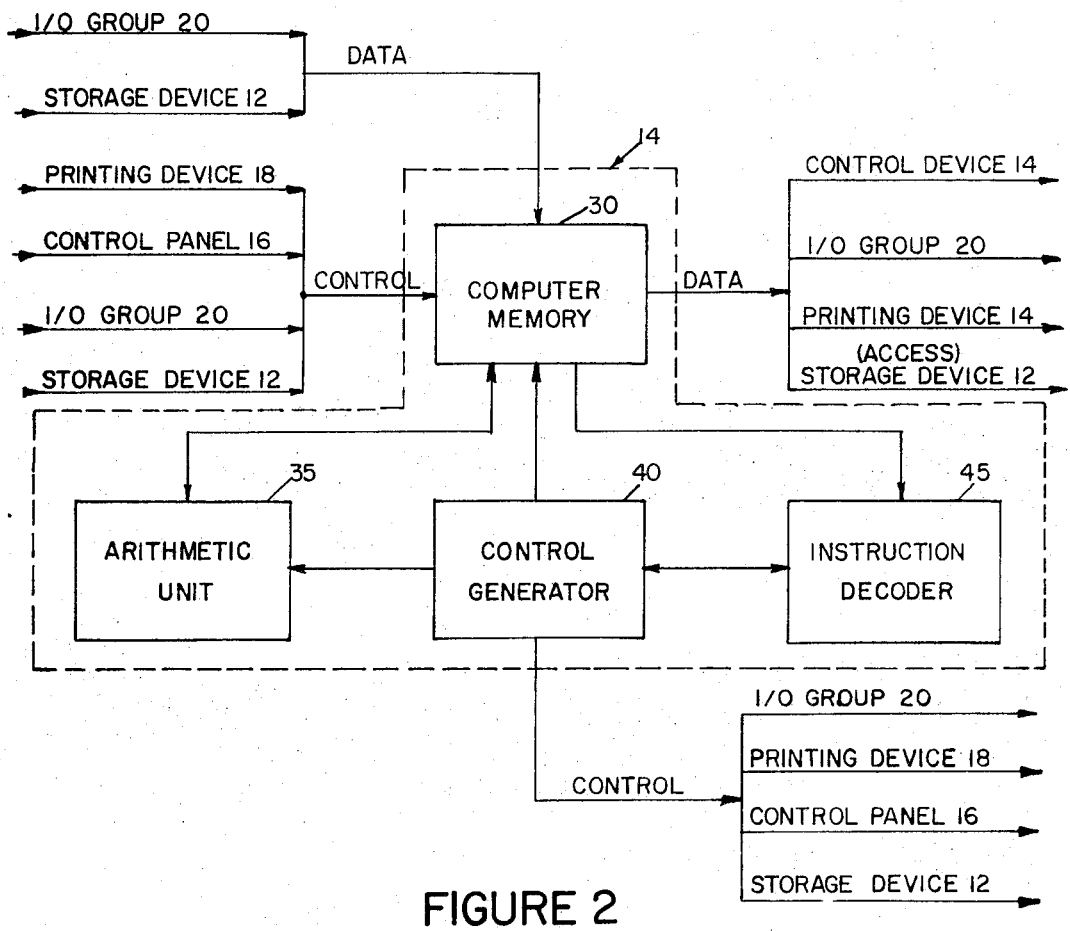
FIG. 2 is a block diagram of the computer of the system illustrated in FIG. 1, generally illustrating the flow of data and control signals.

As illustrated in FIG. 2, computer 14 provides for storage of the computer programs, temporary storage of the reference data from the storage device 12 and I/O group 20; performs the required arithmetic operations, conversions and formatting of data to the control panel 16, I/O group 20, printing device 18 and storage device 12; receives control signals from the printing device 18, control panel 16, I/O group 20, and storage device 12 for the purpose of manipulating and controlling information and to generate control signals for the I/O group 20, printing device 18, control panel 16, and storage device 12.

The computer includes a computer memory 30 which stores the computer instructions and reference data from storage device 12 and I/O group 20 and which is controlled by control signals from printing device 18, control panel 16, I/O group 20 and storage device 12. Additional control signals are transmitted to memory 30 from a control generator 40 and an arithmetic unit 35 and an instruction decoder 45 carried in the computer. Decoder 45 interprets the program instruction from the computer memory 30 and based on this interpretation activates control generator 40 to sense the instruction and generates the control signals that instruct arithmetic unit 35 which operates to perform and provide all the basic control for the I/O group 20, printing device 18, control panel 16 and storage device 12.

Storage Device

Figure 3:
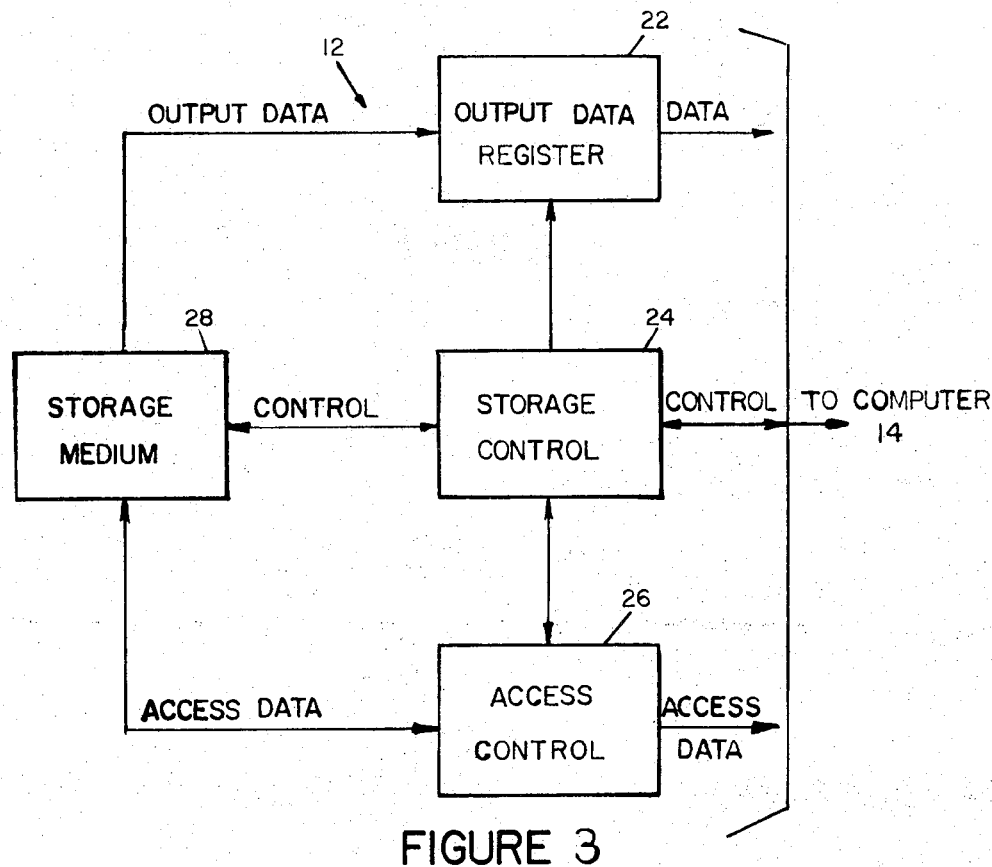
FIG. 3 is a block diagram of the storage device illustrated in FIG. 1, generally illustrating the flow of data and control signals.

Storage device 18 is capable of retaining and automatically accessing a large mass of digitally encoded data. It is a read-only device that receives from the computer control signals and accessing data which instruct it to retrieve and transfer to the computer a unique block of information from a storage medium that contains the entire data mass. The storage device provides the computer with control signals that inform the computer when the requested information is available for transfer to the computer memory. FIG. 3 shows the necessary interrelationships among the various components of the storage device.

The storage medium 28 consists of a large mass storage device that is accessed from the computer 14 through the access control 26 and controlled by the computer 14 through the storage control 24. When the data is accessed it is shifted from the storage medium 28 to the output data register 22 under the control storage control 24 to the computer.

Input/Output Group

Figure 4:
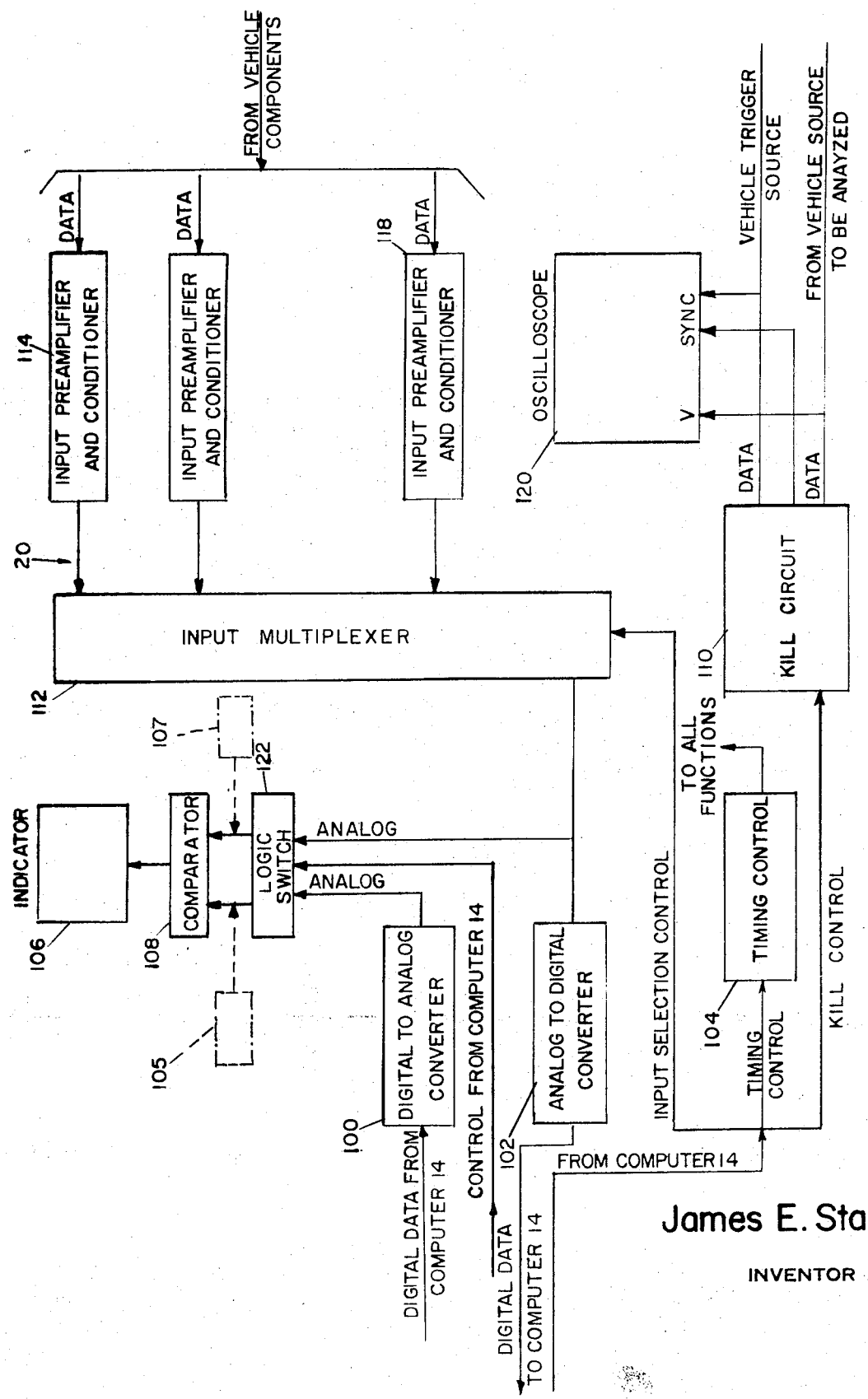
FIG. 4 is a block diagram of the input/output group shown in FIG. 1, generally illustrating the flow of data and control signals.

As indicated in FIG. 1, the I/O group 20 provides an electrical interface between the system and the vehicle under analysis. The I/O group receives analog signals from the vehicle and digital signals from the computer. It reconciles these different signals forms and at the same time provides a visual indication of these signals to the operator. Referring now to FIG. 4, analog signals from the various components of the vehicle are fed in one or more of the input preamplifiers and conditioners 114, 116 and 118, where they are amplified and/or conditioned such that they are in a form usable by an input multiplexer 112. The input multiplexer is an electronically controllable switch which selects one of its input signals and delivers this signal to both analog comparator 108 and analog to digital converter 102. The digital output from the analog to digital converter is available to the computer for analysis or printout of the particular parameter under measurement. Computer 14 supplies a digital input to digital to analog converter 100 whose analog output is a second input to the comparator 108. The comparator generates the algebraic difference of its two inputs and displays this difference on indicator 106 which is typically a center-zero electromechanical meter. In this way the system can, by means of the indicator, compare the correct value of a vehicle component specification to the measured value received from the vehicle under test. In certain tests unacceptable deviations may be noted by the operator through observation of the indicator and by examination of printout material. Computer 14 may also note unacceptable deviations since it has available to it (from the analog to digital converter) e digital representation of the measured value from the vehicle.

By means within the input multiplexer 112, its control from the computer 14 and the computer inputs to the D/A converter 100, the indicator 106 may also be used to selectively show absolute values from the computer and the vehicle under test.

Figure 8:
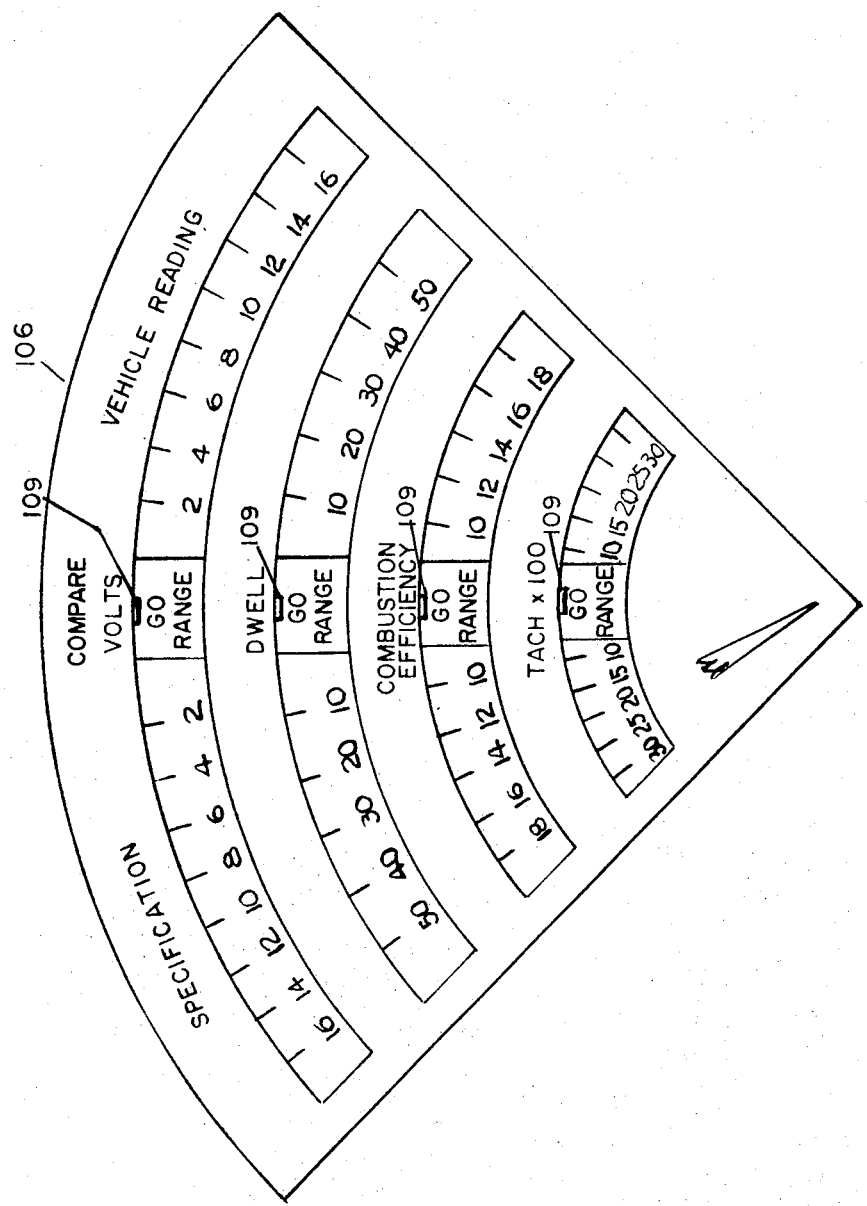
FIG. 8 is a pictorial view of a meter as used in my invention.

As illustrated in FIG. 8, the indicator face may include a series of calibrated scales on either side of the centered null line for direct reading of the absolute value of the vehicle specification or of the actual reading taken from the vehicle. To indicate which scale is to be read, each is provided with an indicator light 109 which is illuminated automatically by a signal from multiplexer 112. It will be noted that each scale is provided with a "go range" for use during comparison. Thus, any reading outside this range would be unacceptable. This arrangement provides the operator with a considerable amount of flexibility. For example, for any given test, by operation of the numeric input keys he may read the absolute value of the specification on one side of the indicator, the absolute value of the vehicle component on the other side of the indicator, or he may compare the two in the middle or "compare" portion of the indicator. If a comparison is outside the "go range" a coded symbol may be included adjacent to the test result printout. Alternatively, meters such as those shown in phantom and indicated by numbers 105 and 107 may be utilized to show absolute values, while 106 may then be used only for comparison indications.

Oscilloscope 120 provides a visual indication of the dynamic conditions of certain vehicle components. Included in the oscilloscope circuit is a kill circuit which is used to selectively eliminate the electrical pulse which is normally transmitted to each cylinder of an ignition-type engine. By elimination of one or more of these pulses one may by observation of a tachometer reading on indicator 106 determine the relative effectiveness of the cylinder or cylinders which have been "killed."

Indicator key 89 permits the operator to override automatic functions and selectively display on indicator 106 the absolute value of the specification, the absolute value of the vehicle condition signal, or a comparison of the two.

Timing control 104, in conjunction with control generator 40 (FIG. 2), determines the basic timing which controls the various equipment. This timing is accomplished in a manner well known in the computer art and will not be detailed here.

Printing Device

Figure 5:
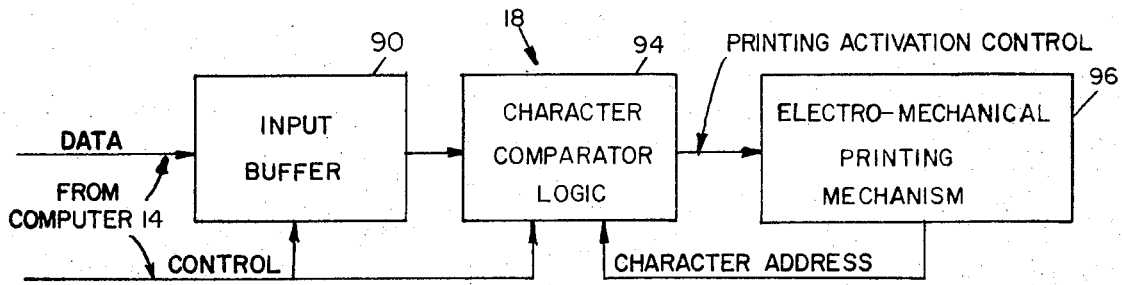
FIG. 5 is a block diagram of the printing device shown in FIG. 1, generally illustrating the flow of data and control signals.

As indicated in FIG. 5, printing device 18 provides means to permanently record data received from computer 14. It consists of an input buffer 92 which receives data from the computer and converts it to a form required by character comparator logic 94. The character comparator logic in turn compares this output with the character address and produces a print activation control signal which is transmitted to the electromechanical printing mechanism. Control signals are provided from the computer 14 to the input buffer 92 and the character comparator logic 94.

Control Panel

Control panel 16 provides the primary communication path between the operator and the computer. The general appearance of the control panel is shown in FIG. 7.

Figure 6:
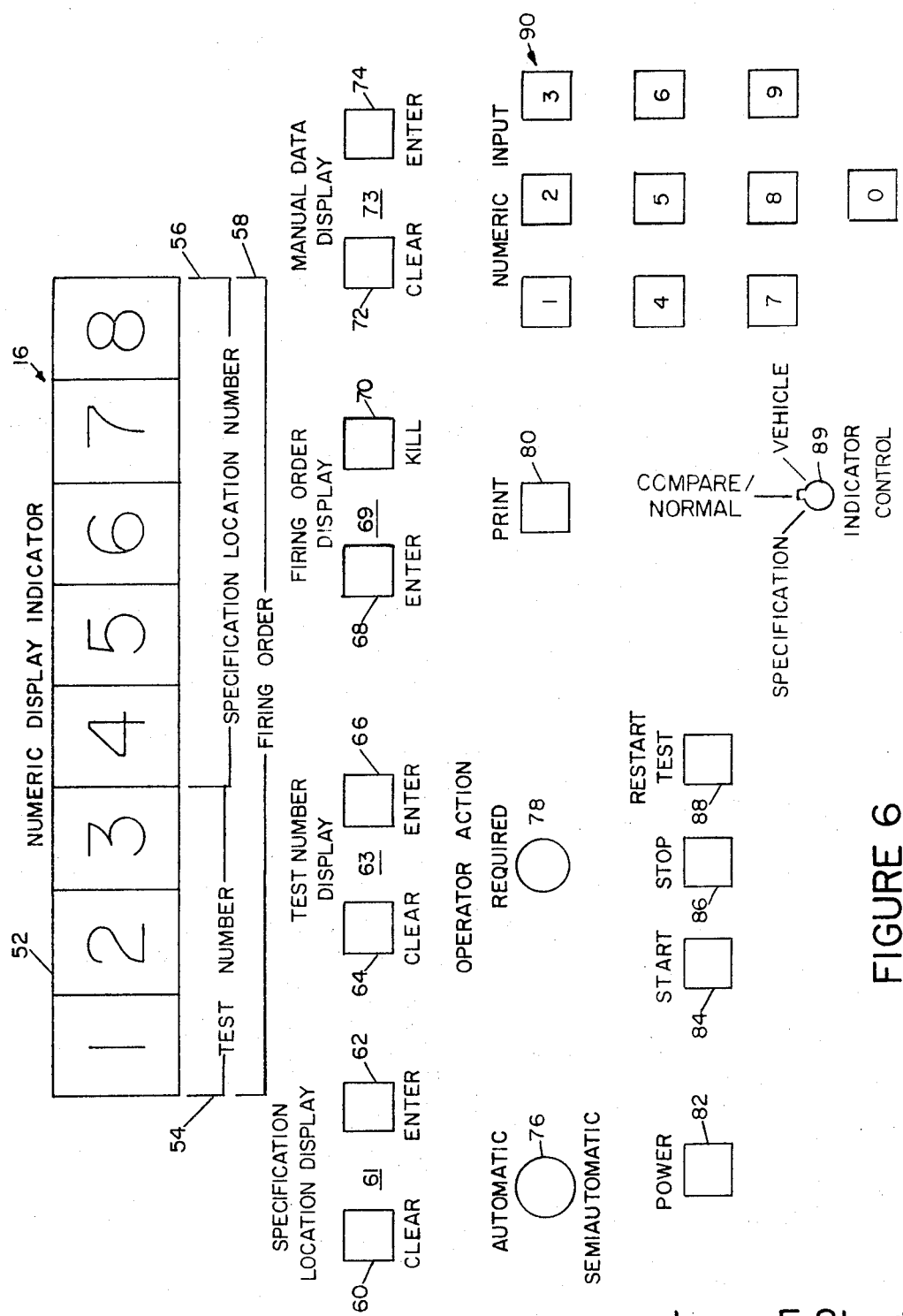
FIG. 6 is a block diagram of the control panel shown in FIG. 1, generally illustrating the flow of data and control signals.
Figure 7:
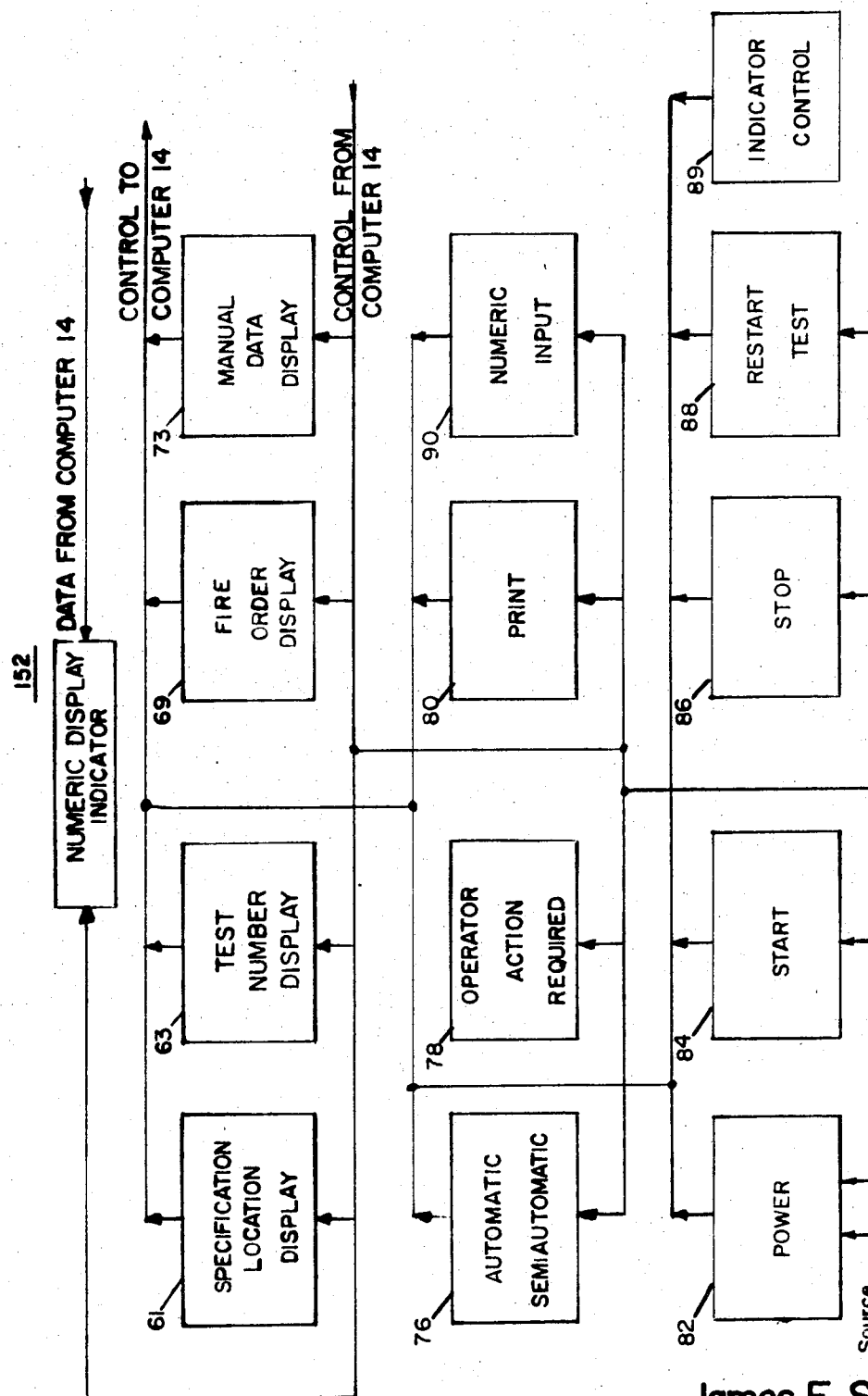
FIG. 7 is an illustration of one arrangement of the control switches and indicators on a typical control panel which may be employed to operate the system.

Operation of the control panel can best be understood by alternate reference to FIGS. 6 and 7 wherein FIG. 6 illustrates the data and control flow and FIG. 7 illustrates a typical arrangement of controls and indicators.

To assist in a clear understanding of the overall functions of the control panel, a description of the operation and indications of each component of this panel follows.

Numeric display indicators 52, FIGS. 6 and 7 (abbreviated NDI) consist of eight 10-digit numeric indicators. Their main function is to provide a medium for communication between the operator and the computer.

Depression of the specification location display clear key 60 clears any existing information contained in the NDI and allows the input of a data block access number via the 10 numeric input keys 90. By means of the numeric input keys the operator sequentially enters the digits of the desired data block access number.

Depression of specification location display enter key 62 causes the access number of the most recently accessed block of data to be set into the NDI. As the data is entered, the data access number is displayed within the brackets 56 labeled "specification location number" which includes the last five positions of the NDI. When the correct number of access number digits has been entered, further numeric input is disabled, and the specification location display enter key is illuminated, indicating that a valid access number appears in the NDI.

Automatically, test numbers will appear within brackets 54 labeled "test number" which includes the first three digits of the NDI, indicating the first test to be performed.

Depression of test number display clear key 64 clears the NDI within brackets 54 and sets the panel to the test number display enter mode. In this mode, the operator may enter a new test number within the test number brackets 54. The test number display enter mode is useful when the operator desires to perform isolated, nonsequential testing. When the operator has entered a valid test number, further numeric input is disabled, and test number display enter key 66 is illuminated.

If the data which has been accessed relates to an engine, depression of display firing-order enter key 68 causes the firing order of the engine being tested to be displayed by the NDI within firing-order brackets 58. Whenever the firing order is being displayed by the NDI, the display firing-order enter key is illuminated. Depression of the firing-order display kill key 70 sets the panel to the "kill" mode. When the panel is in the "kill" mode, the firing-order display kill key is illuminated, and subsequent depression of a particular numeric input key causes the corresponding cylinder of the engine under analysis to be disabled (by the removal of the ignition spark to that cylinder). At the same time the digit in the NDI corresponding to the disabled cylinder is turned off, thereby indicating which cylinder or cylinders are disabled. Depression of other numeric input keys causes similar action on the other cylinders and their corresponding firing-order digits in the NDI. To "kill" only one cylinder at a time requires the redepression of the firing order display kill key 70 prior to depression of another numeric switch. Depression of any key other than firing-order display kill or a numeric input key forces the panel to leave the "kill" mode and at the same time enables all disabled cylinders.

Manual data display keys 72 and 74 are used primarily when specifications are not available from the system storage device. Depression of the manual data display enter key 74 causes the panel to enter manual data display enter mode, illuminate the enter key and allow the operator by depression of selected numeric input buttons, to enter specifications pertinent to the current test procedure. Manual data display clear key 72 allows the operator to clear data set in from the numeric input keys.

Power key 82 is a switch which controls the main power input to the stem. This key is provided with an internal indicator light which is illuminated only when power is being supplied to the system.

Start key 84 has multiple functions. If the specification location display enter and test number display enter keys 62 and 66 are both illuminated, depression of the start key causes the computer to extinguish both keys and to access the data block indicated by the data access number contained in the NDI. Depression of start key 84 when the test number display enter key 64 is illuminated causes the computer to initiate the test procedure whose sequence number appears in the NDI. Depression of the stop key 86 halts the computer. Depression of the start key when only stop key 86 is illuminated causes the computer to start at whatever place it was when it was halted.

Whenever the computer is in the halt state, the stop key is illuminated. In order for any key to be effective (with the exception of the stop key) the computer must in the halt state.

Automatic semiautomatic key 76 controls the sequence of operations in the computer. When this key is in the "automatic" position, the computer, as it completes one test procedure, automatically proceeds to the next test procedure in the testing sequence, stopping only when operator action is required or when the operator depresses the stop key. When the "automatic semiautomatic" key is in the semiautomatic position, the computer stops after it completes each test procedure. It must be restarted manually by depression of the start key. At this command, it proceeds on to the next test procedure.

Indicator 78 which is labeled "operator action required" is illuminated whenever the operator is required to perform some operation. This operation can be the manual entry of data or test results, the accomplishment of a required engine adjustment, or the depression of the start key.

Depression of print key 80 causes the printer to record certain data received from the storage device via the computer or from the vehicle at the completion of an adjustment or component replacement that cannot be detected automatically. When this happens, the operator action required indicator 78 will light, the print key will be depressed and the computer will automatically proceed to the next test.

It should be pointed out that whenever the system requires operator action, a unique code is displayed in the NDI which indicates to the operator the precise nature of the required intervention.

Restart test key 88 causes the computer to restart the particular test procedure currently in progress or which it has just completed. In this manner, it behaves slightly differently from the start key 84 which merely restarts the computer if it were halted by the stop key 86, or which causes the computer to initiate a new test procedure if a new test number were entered.

It should be pointed out that while manual depression of any key except the stop key has no effect unless the computer is first halted, the computer itself can electronically "depress" any key (except, of course, the start key) and thereby indicate to the operator via the NDI relevant information.

The indicator control key 89 permits the operator to override the normal automatic functions and selectively display on indicator 106 the absolute value of specifications, the absolute value of the vehicle test conditions or a comparison of the two.

Operation

The operator and the analyzing system are located adjacent the vehicle to be analyzed. The power key 82 is activated and the power light is illuminated. From a reference card the address of the type vehicle to be analyzed is determined (assume Chevrolet Impala, V8, 1969 model—address 65,000). The operator depresses the clear key 60 which clears the access data from the computer memory 30 and extinguishes the information from the numeric display indicator 52. The operator depresses the numeric input keys 90 in this order 6 5 0 0 0, which causes this code to be shifted into the computer memory 30. Several actions happen:

The instruction decoder 45 interprets the computer program for a new entry from the computer memory 30 and based on this interpretation causes the control generator 40 to generate several control signals to the I/O group 20, printing device 18, control panel 16 and storage device 12, and instructs the arithmetic unit 35 which arithmetic operations to perform. The results of these operations are fed to the computer memory 30. The storage medium 28 transfers requested information to the input of output data register 22.

Within printing device 18, data and control signals provided by computer 14 are fed to input buffer 92; and control signals are fed to the character comparator logic 94. The electromechanical printing mechanism 96 provides character address information for comparison with the input data, and causes a print activation control signal to be applied to the electromechanical printing mechanism 96.

Simultaneously the specification location display enter light within key 62 is illuminated by a control enter pulse from the computer memory 30 and the number 6 5 0 0 0 will appear in the last five digits of the numeric display indicators 16. When the printer has completed a printout of the applicable specifications data, digits 1 0 1 appear in the first three digit places of the numeric display indicator 16, indicating the storage device is halted on category number 1, test number 1.

The operator action required light is illuminated and the appropriate scale indicator 106 of the I/O group shows a meter reading of the specification required for the first test. This meter reading is a result of data being fed from the computer memory 30 to the D/A converter 100 and from comparator 108 to the meter indicator 106. Even though the vehicle under test is connected to the system, the input multiplexer 112, through control from the computer 30, prevents the vehicle voltage from being applied to the comparator 108.

The test procedure is typically categorized into separate test categories with each category including a plurality of individual tests. For example, the first category may be designated the "start" sequence. This category includes individual tests rating to cranking voltage, cranking coil output, cranking vacuum and a positive crankcase ventilation test.

Other test categories are accomplished in the "idle" (500 r.p.m.) mode, and at other r.p.m. increments, such as 1,000 and 2,500 r.p.m. Each test category includes a plurality of specific tests to be performed at designated engine speeds. The recited categories are representative of some typical test categories relating to engines. These categories are recited as examples only. It is to be understood that this system is equally effective in analyzing other major and minor items such as transmissions, drive trains, brake systems or any component capable of emitting a detectable signal, regardless of the form of the signal. For example, the signal may be electrical, acoustical or mechanical.

To indicate the first test in the first test category (assuming that the "start" mode is designated the first test category and identified by numerals in the 100 range), the operator notes a "101"in the first three digit places of the NDI by operation of the numeric input keys. Appearance of numeral 101 in the NDI indicates to the operator that the system is set up for the first test of the start category. As indicated above, this is a test to check the cranking voltage of the vehicle. Accordingly, an indicator light 109 adjacent the voltage scale of indicator 106 will automatically be illuminated indicating to the operator which scale is to be read.

For this test, the operator disconnects the secondary wire of the coil preventing the car from starting. With the engine cranking but not starting, the restart key 88 is depressed, and the voltage scale of indicator 106 shows the difference between the specified voltage and the voltage from the vehicle under test. This is accomplished by the restart key providing control through the computer to input multiplexer 112, which receives its input from the vehicle via an input preamplifier and conditioner 114. The print key 80 is depressed causing the vehicle voltage to be routed ultimately to the printer and that value is printed. This is accomplished by causing the input multiplexer 112 output to be fed the A/D converter 102 which in turn feeds this output to the computer memory 30. This multiplexer output is ultimately fed to printer 18 by the computer.

If the automatic semiautomatic switch 76 is assumed to be in the automatic position, the print command for this test will cause the computer 14 to automatically advance to test number 2 (cranking coil output, for example). A similar sequence of actions will occur for test number 2 between the storage device 12, digital computer 14, I/O group 20, printing device 18, and control panel 16. When test number 2 is advanced 1 0 2 will appear in the first three digits of the numeric display indicator 52 and 6 5 0 0 0 still remains within the last five digits.

Tests conducted in the "idle" mode may, for example, be designated idle speed 101; breaker point dwell 102; initial ignition timing 103; fuel mixture 104; and manifold vacuum 105. Tests conducted in the 1,000 r.p.m. or second category may be designated dwell variation 201; fuel mixture 202; cylinder balance (kill mode 203); coil polarity 204; distributor cam lobe accuracy 205; secondary circuit condition 206; coil and condenser condition 207; breaker point condition 208; and spark plug firing voltage 209.

Should it be necessary to recall a test within a specification location number (i.e., rerun category test number 1, step 3 of 6 5 0 0 0) already addressed, the test number display clear and enter are used. To get to test 3, the operator depresses the test number display clear 64, depresses 1 0 3 of the numeric input 90, test number display enter and restart test 88. The digits 1 0 3 will appear in the first three digits of the numeric display indicators 52 and the appropriate data is handled as described before within the various units.

The system will, for purpose of illustration, advance automatically up to the "kill" mode which may be described as a cylinder balance test. This test will be identified as category test number 3, step number 9. When this test is automatically indicated on the numeric display indicators 52 (3 0 9 6 5 0 0), the operator observes the operator action required 78 light illuminated. He then depresses the firing-order display enter 68, thereby placing the system in the "kill" mode, and causing the engine's firing sequence to appear on the eight-digit numeric display indicators 16. Depression of any switch on numeric input 90 will kill that cylinder by grounding the primary of the coil through kill circuit 110 of the I/O group 20.

Simultaneously, the associated light within numeric input keys 16 will be extinguished so as to indicate to the operator the specific cylinder that has been killed. Depression of additional numeric input keys will kill associated cylinders in any sequence desired by the operator. To kill only one cylinder at a time requires the "kill" 70 key to be redepressed to remove the previous "kill" signal. In addition to a tachometer comparison of the effect of killing individual cylinders or groups of cylinders, another purpose of this test sequence is to allow selective operator analysis of the engine ignition system on the oscilloscope 120 of the I/O group 20. A typical engine test sequence may set aside one test for an operator's observation of the oscilloscope or other equipment and provide for manual typing of his analysis of the scope patterns or readings. This manual typing would be performed in a manner similar to the procedure used for manual entry of specifications.

The manual data display clear and enter keys allows the operator to enter data from the numeric input keyboard 90 when data is not contained on a specific vehicle to be tested. A specific address is contained within the storage device 12 which holds all general information necessary for vehicle testing. Specific data must be set in through the numeric input 90 and is printed out in normal fashion by printing device 18.

In the performance of a test sequence of this type the automatic semiautomatic switch 76 provides a control to the digital computer 14 which causes the system to automatically advance when a test is completed or to require the operator to depress the restart test key 88 after receiving an action indication from the operation action required indicator 78. The exception to this occurs when certain tests cannot be performed automatically even though the system is in the automatic mode. When the system proceeds to such a test, automatic operation ceases and the operator action required 78 is illuminated. Further operation depression of the restart test key 88.

The indicator rotary key 89 is normally in the compare/normal mode, permitting the operation to perform as previously specified. However, the operator has the option of selecting either the absolute value of the specification or the absolute value of the vehicle with this key for display on indicator 106. This is accomplished by control signals to the computer 14 and on to the switch 122 to select the information. The indicator key 89 overrides other automatic functions and must be returned to the compare/normal mode after the data is received.

The power switch 82 controls the input voltage to the power supply which is integral to the control panel 16. The power 82 light illuminates when the power is available to all units.

The start 84, stop 86, and restart test test 88 are control signals to the computer 14 where ultimately the control generator 44 will provide the control gates in response to their depression.

It is to be understood that the foregoing drawing and description are for illustrative purposes only and are not to be taken in the limiting sense and that obvious modifications may occur to one skilled in the art, but such modifications are within the scope of the appended claims.

I claim:

1. An apparatus for analyzing various condition signals received from an internal combustion engine to be tested comprising:
   a. an information storage device for storing specification information and producing selected specification signals when addressed;
   b. computer means for receiving said specification signals and converting them to usable voltages;
   c. kill circuit means for disabling selected cylinders of said engine;
   d. control means including numeric input means for addressing the storage device to select and initiate retrieval of specification information from said storage device, said control means further including numeric indicator means disposed for response to signals from said computer to display the firing order of said engine, said numeric input means operatively connected to said kill circuit means to disable a desired cylinder of said engine, and said numeric indicator means disposed for receiving signals from said kill circuit through said computer for indicating the disabled cylinder; and,
   e. power supply means for operating each component of the test apparatus.

2. An apparatus as set forth in claim 1 wherein said numeric indicator means in response to selected sequential control and computer signals displays specific test information in addition to said firing-order display.

3. An apparatus as set forth in claim 2 (1) wherein said control means includes numeric indicator means for simultaneous display of the specification information address and the test mode.

4. An apparatus as set forth in claim 1 including additional indicator means for receiving said usable voltages and for comparison thereof to condition signals to be tested, and for selectively indicating the usable voltages, the condition signals and the comparison of the two.

5. An apparatus as set forth in claim 4 wherein said second-mentioned indicator means comprises a unitary structure disposed for selectively receiving the specification signals and the condition signals for comparison and display thereof.

6. An apparatus as set forth in claim 5 wherein said unitary indicator means and said computer means include means for identification of the parameter of condition and specification signals being received.

7. An apparatus as set forth in claim 4 (1) wherein said apparatus includes means for selectively producing a printed record of said specification signals, said condition signals and said comparison of the two.

* * * * *